United States Patent [19]
Holmes et al.

[11] Patent Number: 5,627,662
[45] Date of Patent: May 6, 1997

[54] DIGITAL IMAGING SYSTEM USING TWO-DIMENSIONAL INPUT SENSOR ARRAY AND OUTPUT LIGHT VALVE

[75] Inventors: Maurice F. Holmes, Rochester, N.Y.; John S. Brown; Malcolm J. Thompson, both of Palo Alto, Calif.; William D. Turner, San Marino, Calif.

[73] Assignee: Xerox Corporation, Stamford, Conn.

[21] Appl. No.: 234,098

[22] Filed: Apr. 28, 1994

[51] Int. Cl.⁶ ............................................. H04N 1/04
[52] U.S. Cl. .................. 358/474; 358/401; 358/475; 399/217
[58] Field of Search ..................... 358/474, 475, 358/479, 483, 487, 297, 300, 401; 355/228, 122, 132, 233, 241; 250/208.1; 359/36, 345, 315, 322; 345/33, 102; H04N 1/04

[56] References Cited

U.S. PATENT DOCUMENTS

| | | | |
|---|---|---|---|
| 4,466,734 | 8/1984 | Rees | 355/58 |
| 4,560,994 | 12/1985 | Sprague | 346/108 |
| 4,638,334 | 1/1987 | Burnham | 346/108 |
| 4,799,050 | 1/1989 | Prince et al. | 340/765 |
| 5,028,939 | 7/1991 | Hornbeck et al. | 346/160 |
| 5,128,773 | 7/1992 | Sato | 358/332 |
| 5,198,920 | 3/1993 | Gobeli et al. | 359/245 |
| 5,255,054 | 10/1993 | Tsai | 355/202 |
| 5,313,726 | 5/1994 | Yaniv et al. | 40/361 |
| 5,315,418 | 5/1994 | Sprague et al. | 359/41 |
| 5,475,514 | 12/1995 | Salerno et al. | 359/41 |

OTHER PUBLICATIONS

European Search Report for corresponding Application No. 95302511.1.
Hammond, Thomas J. "Color Printer Modification for Flash Based Copier" Xerox Disclosure Journal, vol. 16, No. 5, XP 000228148, Sep./Oct. 1991, Stamfod, Conn., US, p. 305.

*Primary Examiner*—Edward J. Coles, Sr.
*Assistant Examiner*—Madeleine Anh-Vinh Nguyen
*Attorney, Agent, or Firm*—Stuart P. Kaler; Tracy L. Hurt

[57] ABSTRACT

The present invention is a digital imaging system for a copier that comprises a full-frame, two-dimensional sensor array to capture a document's image and a full-frame output light valve with backlight to flash expose the image onto a photoreceptor belt. The document is flash exposed to illuminate the page and the full-page image is captured by the full-frame, two dimensional sensor array. The sensor array then reads out the digital image data in response to a driver. The data is then input into the full-frame digital output light valve. The driver provides for the synchronous control of the system. Optionally, an electronic subsystem may perform digital image processing according to user demand—before the data arrives at the output light valve. After image processing (if any), the digital data, supplied to the full-page output light valve, forms a pattern on the display according to the data. The patterned image is then flash exposed by a backlight, through the light valve, and onto a photoreceptor.

9 Claims, 4 Drawing Sheets

DIGITAL IMAGING SYSTEM USING TWO-DIMENSIONAL INPUT SENSOR ARRAY AND OUTPUT LIGHT VALVE

FIELD OF THE INVENTION

The present invention relates in general to imagers that capture full-page images digitally and, in particular, to digital imagers that use two dimensional (2D), full frame input sensor arrays and two-dimensional output light valves.

BACKGROUND OF THE INVENTION

Since the advent of xerography, the trend in the copier arts has been to construct copiers with ever increasing speed and accuracy, while simultaneously providing a greater level of functionality to the end user. For the early part of copier's history, that trend was marked by incremental performance improvements through better engineering of materials and design.

The first copiers were slow and cumbersome for the user—document pages were manually fed in one sheet at a time, thus demanding the undivided attention of the human user. This situation improved for the user with the introduction of the automatic document feeder. The automatic feeder, coupled to, and synchronized with a "light/lens" scanner, allowed for faster copying with correspondingly less attention required of the user.

The input scanner of the typical copier, for many years, was the traditional "light/lens" scanning bar. The scanning bar worked by illuminating a portion of a document page and projecting that image, through a series of optics, to a photoreceptor which then captured the image. The scanning bar would proceed down the page, line-by-line fashion, until the entire image was captured.

Although light/lens scanning continues to provide reliable image capture, a major limitation is speed. Scanning a document page, line-by-line, by mechanically moving the scan bar down the length of the document page has become the bottleneck in document processing. To alleviate this bottleneck, some have attempted to flash expose a document page in order to capture the entire page image in one short instance. One such imaging system is described in commonly assigned U.S. Pat. No. 4,466,734 to Rees, entitled "Compact Full Frame Illumination and Imaging System for a Photocopier", issued Aug. 21, 1984. Rees describes a compact, full-frame illumination system employing a movable lens system that allows for image enlargement and reduction. Rees' system does not, however, capture the document image in a digital format.

With the increasing demand for image manipulation and processing, this lack of digital image capture represents another limitation of light/lens scanning. Light/lens scanners may perform some limited image processing quite naturally—namely, image reduction and enlargement. These processes are easily accomplished by selecting the correct optical magnification.

However, with users becoming more sophisticated in terms of the range of applications desired, a digital format is more amenable to these sophisticated demands. For example, image rotation, identification and selection, optical character recognition, and the like are more easily performed using a digital image format.

To meet the demand for digital image processing, a number of linear digital image scanners were developed: charge coupled devices (CCD), butted silicon full width arrays, amorphous silicon full width arrays, and raster input scanners. Although all of the above mentioned scanners capture a document's image digitally, they all suffer the same defect of capturing an image line-by-line scanning. As with the early light/lens systems, the limitation of capturing an image by line scanning is speed. Capturing a portion of the document at a time is not as fast as capturing the entire, full-page image simultaneously.

Another limitation arises due to the relative motion that occurs between the document and the linear scanning bar. This relative motion happens if the document is passed over the linear scanning bar or if the bar is moved over the length of the document. In either case, exacting mechanical precision is required to accurately capture the image of the entire document. Even the slightest deviation in motion control may cause visual effects in the final hard copy printout that is noticeable to the human eye. Moreover, relative motion problems may be exacerbated at very high throughput rates.

In a copier, the problems of speed and relative motion arise not only at the input image capture (where the image of the document page is captured), but also where an image derived from digital data exposes a photoreceptor belt for ultimate transfer to a hard copy medium such as paper. For example, one method of producing a latent image from digital data is raster output scanning. A raster output scanner sweeps a laser beam across the surface of a moving photoreceptor and writes the image in a line-by-line fashion. This linear writing method exhibits both drawbacks of speed and relative motion control.

Another method of digital printing that eliminates relative motion control problems has been described in: "Hybrid ER Copier", "Printer Modification for Flash Based Copier", "Color Printer Modification for Flash Based Copier", and "Fax Modification for Flash Based Copier", all by Thomas Hammond, published in Xerox Disclosure Journal (XDJ) Vol. 16, No. 5, September/October 1991, at pages 309, 311, 305 and 307 respectively.

Hammond's basic digital printer, as described in "Printer Modification for Flash Based Copier", uses a reflective (i.e. no backlighting), full frame, liquid crystal display (LCD) as a front end image projector for a flash based copier. Hammond proposes positioning the LCD over the platen of the copier in such a manner as to allow the LCD to provide the input image into the copier.

To print digital data, Hammond first loads digital data into the LCD. Once the full LCD page is displayed, the copier would flash expose the LCD, thus exposing the copier's photoreceptor with the image data displayed on the LCD. In effect, the photoreceptor would be exposed with the same image data as if the original document were on the platen.

Hammond's basic digital copier, as described in "Hybrid ER Copier", again uses a reflective LCD display sitting atop a platen of a flash based copier. Additionally, Hammond adds a raster input scanner (RIS) and an appropriate electronic subsystem (ESS) to his digital printer configuration. In copy mode, a document is scanned by the RIS and the information is processed by the ESS and loaded into the LCD array a page at a time. After the LCD is set, operation continues in the same fashion as Hammond's digital printer described above.

Hammond's method of digital printing/copying allows for the decoupling of the functions of digital printing/copying and ordinary light/lens copying. Hammond describes that, by removing the LCD from atop the platen, the flash-expose copier may function in an independent, stand-alone mode. However, merely combining an LCD and a separate copier together to produce a printer is not effective from both a design and user point of view for several reasons.

First, to achieve this effective decoupling, Hammond uses a reflective LCD (as opposed to a transmissive LCD) to provide image capture. The copier then performs image exposure of its photoreceptor by flash exposing the LCD whenever the user commands. To copy another full frame image, the user would wait for the next image to be set in the LCD before the copier is allowed to flash expose. Thus, without a tighter coupling of the LCD to the copier, printer/copier throughput suffers.

Second, a separate, detachable LCD would need to be properly registered every time it was reattached to the copier. This reattachment and registration requires that the user invest additional time in the proper usage of Hammond's digital printer and copier.

Third, in Hammond's digital copier, the image input is still produced by a line-by-line, raster scanning technique. It is known that raster scanning, however, is limited by the top speed that a laser beam can be scanned across a page line. Additionally, raster scanning must be exactingly precise to eliminate relative motion errors.

Thus, there is a need for a digital imager for a copier that tightly couples the functions of image capture and image exposure. Additionally, there is a need for a digital imager that can synchronize these functions at electronic speeds to increase printer/copier throughput without the attendant problems of relative motion.

Therefore, it is an object of the present invention to create an imager that captures a full-page document image digitally while simultaneously eliminating the motion control problems associated with image capture and exposure.

It is another object of the present invention to create an imager that electronically couples the functions of image capture and image exposure on to a photoreceptor surface.

SUMMARY OF THE INVENTION

In summary, the present invention is a digital imaging system for a copier that comprises a full-frame, two-dimensional sensor array to capture a document's image and a full-frame output light valve with backlight to flash expose the image onto a photoreceptor belt.

The document is flash exposed to illuminate the page and the full-page image is captured by the full-frame, two dimensional sensor array. The sensor array then reads out the digital image data in response to a driver. The data is then input into the full-frame digital output light valve. The driver provides for the synchronous control of the system. Optionally, an electronic subsystem may perform digital image processing according to user demand—before the data arrives at the output light valve. After image processing (if any), the digital data, supplied to the full-page output light valve, forms a pattern on the display according to the data. The patterned image is then flash exposed by a backlight, through the light valve, and onto a photoreceptor.

One advantage of the present invention is increased document throughput speed. Electronically coupling the full-page input sensor array to the full-page output light valve, with the possibility of some intermediate electronic processing, has significant speed advantage over either line-by-line scanning methods or the loose coupling of image capture and image exposure as described above by Hammond.

Another advantage is that the problem of relative motion imposed by linear scanning is eliminated. The full-page, flash exposure of an image onto the photoreceptor occurs in a few microseconds; thus any relative motion of the photoreceptor belt and the image is negligible.

Additional objects and features of the present invention will be more readily apparent from the following detailed description of an exemplary embodiment thereof, as illustrated in the accompanying drawings.

BRIEF DESCRITION OF THE DRAWINGS

The purpose and advantages of the present invention will be apparent to those skilled in the art from the following detailed description in conjunction with the drawings.

DETAILED DESCRIPTION OF THE PREFERRED EMBODIMENTS

The following description is presented to enable any person skilled in the art to make and use the invention, and is provided in the context of a particular application and its requirements. Various modifications to the preferred embodiment will be readily apparent to those skilled in the art, and the generic principles defined herein may be applied to other embodiments and applications without departing from the spirit and scope of the present invention as defined by the appended claims. Thus, the present invention is not intended to be limited to the embodiment shown, but is to be accorded the widest scope consistent with the principles and features disclosed herein.

Figure 1:
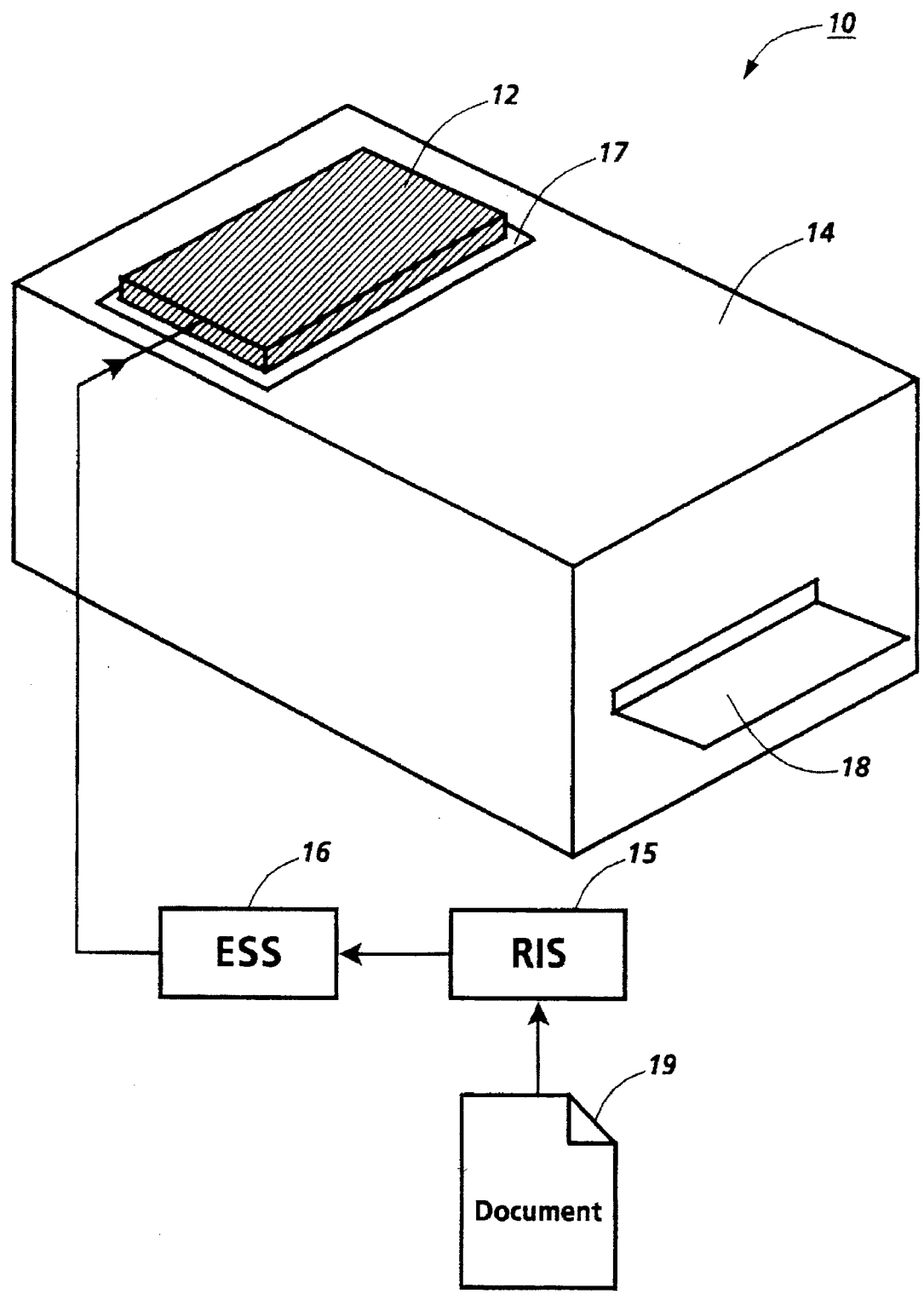
FIG. 1 is a perspective view of the digital copier as described in the aforementioned XDJ article by Hammond.

Referring to FIG. 1, a perspective view is shown of the hybrid ER copier 10 as described in the XDJ article by Hammond. Hammond describes a digital copier which comprises a stand-alone, reflective LCD 12, a stand-alone, standard flash expose copier 14, a raster input scanner (RIS) 15, and an electronic subsystem (ESS) 16. The LCD 12 is placed atop the platen 17 of the copier 14 such that the image created by flash exposing the reflective LCD is focused onto the surface of the photoreceptor (not shown). The copier produces hard copy (e.g. paper) output 18 from image displayed on the reflective LCD.

The LCD 12 is coupled to RIS 15 through ESS 16. The image of a document page 19 is digitally scanned in line-by-line by RIS 15. This digital data is then sent to ESS 16 for additional image processing before it is sent to LCD 12. The LCD 12 is then set with a pattern according to that digital data.

As mentioned above, Hammond's digital copier suffers from a number of drawbacks: the need for relative motion control of its raster input scanning, a limited top speed of image input due to raster scanning, as well as the slower throughput due to the asynchronous functioning of image capture and image display.

Another drawback to Hammond's copier is space design. Hammond proposes using any commercially available flash exposure copier in combination with a reflective LCD by merely setting the LCD atop the platen of the copier. This does not necessarily lead to the optimal design from the standpoint of space requirements. The ordinary optics found in current copiers may require as much as three feet to accommodate the optical path.

Figure 2:
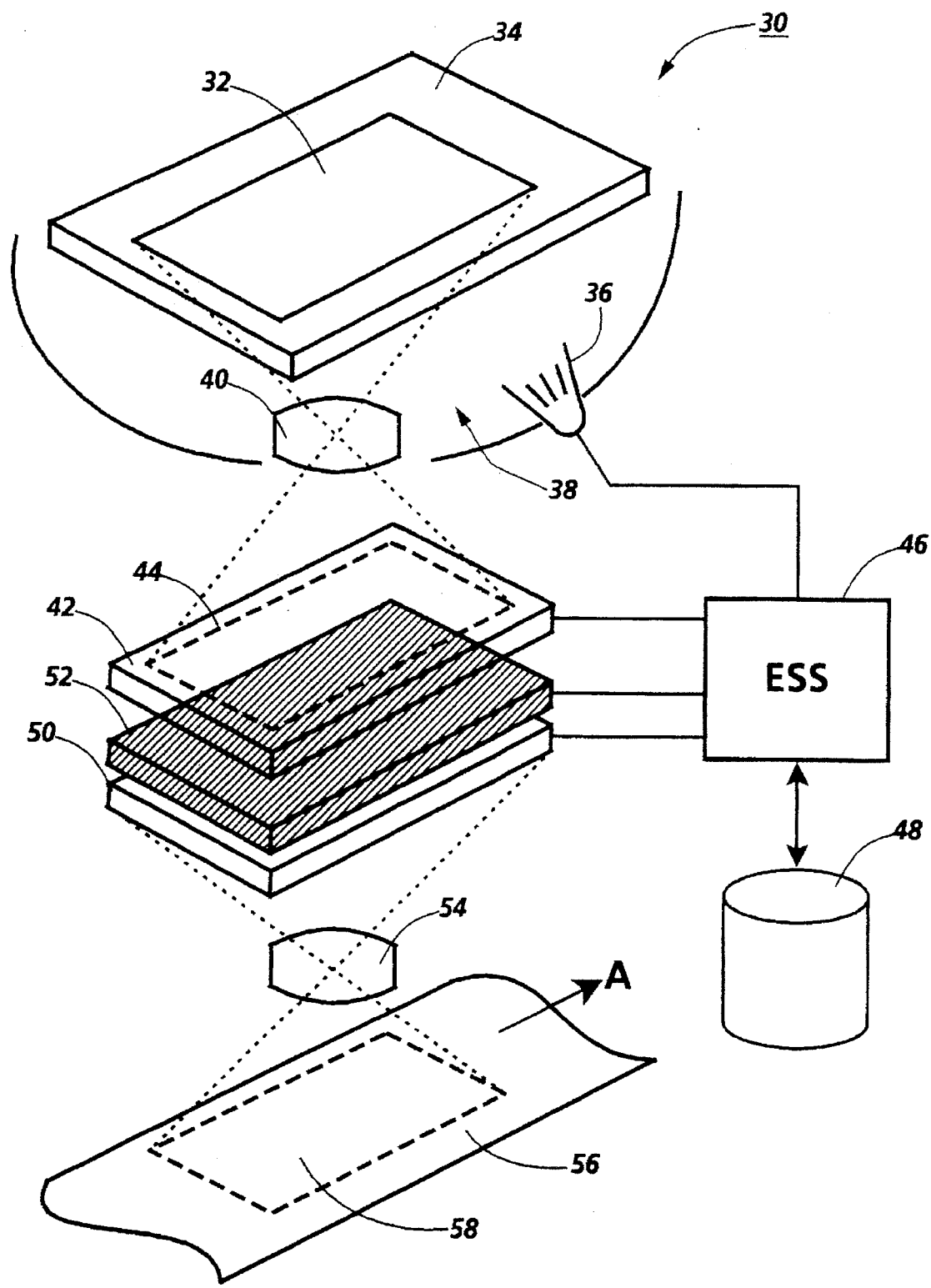
FIG. 2 is a high level diagram of the presently claimed digital imaging system.

FIG. 2 is an embodiment of the presently claimed digital imaging system that combines both a full-page input array scanner with a full-page output light valve terminal. It will be understood that while both full-page input scanners and full-page output light valves currently exist as stand-alone items, the combination of both in a digital imaging system is a novel aspect of the present invention.

In a first embodiment, digital imager 30 comprises a platen 34 on which is supported the document page 32 to be scanned. A flash lamp 36 illuminates page 32 with a relatively intense, short-lived flash of light. The light is contained and further dispersed in an integrating cavity 38. The light reflected by page 32 is focused by optics 40 onto the two-dimensional sensor array 42. The image of page 32 on sensor 42 is represented by dotted area 44.

It will be appreciated that any two-dimensional array sensor will suffice for the purposes of the present invention. In fact, many such sensors are well known to those skilled in the art. One such sensor is discussed in U.S. Pat. No. 4,660,095 issued on Apr. 21, 1987 to Cannella et al., entitled "Contact-Type Document Scanner and Method" which is herein incorporated by reference. Cannella et al. describe the use of a contact-type sensor array on which a document page rests. A backlight is used to illuminate the document page through the sensor array and the reflected light from the page is sensed by the array. The use of these sensor arrays in a contact, wedge shaped scanner is described in commonly assigned U.S. patent application Ser. No. 08/158,676, entitled "Wedge Scanner Utilizing Two Dimensional Sensing Arrays", to Turner, filed on Nov. 29, 1993, which is also herein incorporated by reference.

Once the image is captured by sensor 42, the digital image data is read out by suitable electronics which is well known to those skilled in the art. This data is sent to the electronic subsystem (ESS) 46. At the ESS 46, the image data may either undergo further image processing or it may be stored in some suitable storage 48 (e.g. RAM, flash memory, floppy disk or some other type of magnetic or optical media).

ESS 46 might comprise a microprocessor and control software responsive to user or system demand for the processing and routing of image data. It will be appreciated that the design and control of a suitable electronic subsystem for the processing and routing of image data is well known to those in the art and that the present invention should not be limited to the selection of any particular electronic subsystem.

FIG. 2 also shows that the ESS 46 is coupled to flash lamp 36, sensor array 42, backlight 54, light valve 50, as well as any optional storage 48. The ESS 46 acts as a driver to all the above mentioned components for synchronous function. As a driver, ESS 46 would allow the flash exposure of document 32 only if sensor array 42 were ready to accept image data (e.g. sensor array 42 has read out the previous image data and was reset). Similarly, ESS 46 would allow the flash exposure of the photoreceptor 56 by backlight 52 only if output light valve 50 is ready (e.g. the light valve was set with an image pattern). Additionally, as a driver, the ESS 46 would synchronize the flow of digital data from the sensor array 42 to the light valve 50. This flow would be allowed only if the light valve 50 was ready to accept data (e.g. the previous data has been exposed onto the photoreceptor or some other suitable condition).

It will be appreciated that other methods are available for synchronous control. For example, both flash lamp 36 and backlight 52 could have their own, separate drivers that enable their illumination according to some predefined timing patterns. The only requirement is that exposure of either the input sensor array 42 or the output light valve 50 occur only when either is able to accept data.

For the output light valve 50, the correct time for illumination occurs when the light valve has been set according to the desired image data. Image data may come from the input sensor array 42 from the ESS 46 or it may arrive from the optional storage 48 via ESS 46. Optional storage 48 is available if it is desired to store image data for printout at some later time. Once the light valve 50 has been set according to some desired digital data, backlight 52 may be induced by the ESS 46 to produce a momentary, intense flash of light to project the image with sufficient intensity to expose the photoreceptor 56.

It will be appreciated that although the present invention contemplates using any suitable light valve or output display, it is desirable to use one that has the highest resolution as possible. One such suitable light valve is incorporated into the 13 inch diagonal, 6.3 million pixel display developed by Xerox Corporation. A description of this display may be found in commonly assigned U.S. patent application, application Ser. No. 08/235,011, entitled "Thin-Film Structure with Dense Array of Binary Control Units for Presenting Images" (hereinafter the "Thin Film Structure" application), filed concurrently herewith, which is hereby incorporated by reference.

The image emanating from light valve 50 is focused by optics 54 onto photoreceptor surface 56. It will be appreciated that optics 40 and 54 are generally depicted. The optics may be a traditional combination of lenses, apertures, mirrors and other optical elements designed to focus the image from the light valve onto the photoreceptor. Such suitable optics are well known to those in the art. The present invention should, therefore, not be limited by the choice of any particular optics.

To make an acceptable image on the surface of the photoreceptor, there are two design parameters that must be set for the system. First, a backlight of suitable intensity must be chosen in order properly expose the surface of the photoreceptor. Second, the speed of the photoreceptor, moving in the direction of arrow A, should be matched to the duration of the flash exposure of the image onto the photoreceptor. If the speed is too great then excessive blurring of the latent image will occur. Both of these design consideration are discussed in commonly assigned U.S. patent application, application Ser. No. 08/234,896 entitled "Digital Printer Using Two Dimensional Full Frame Light Valve" (hereinafter the "Printer" application), filed concurrently herewith, which is hereby incorporated by reference.

Figure 3:
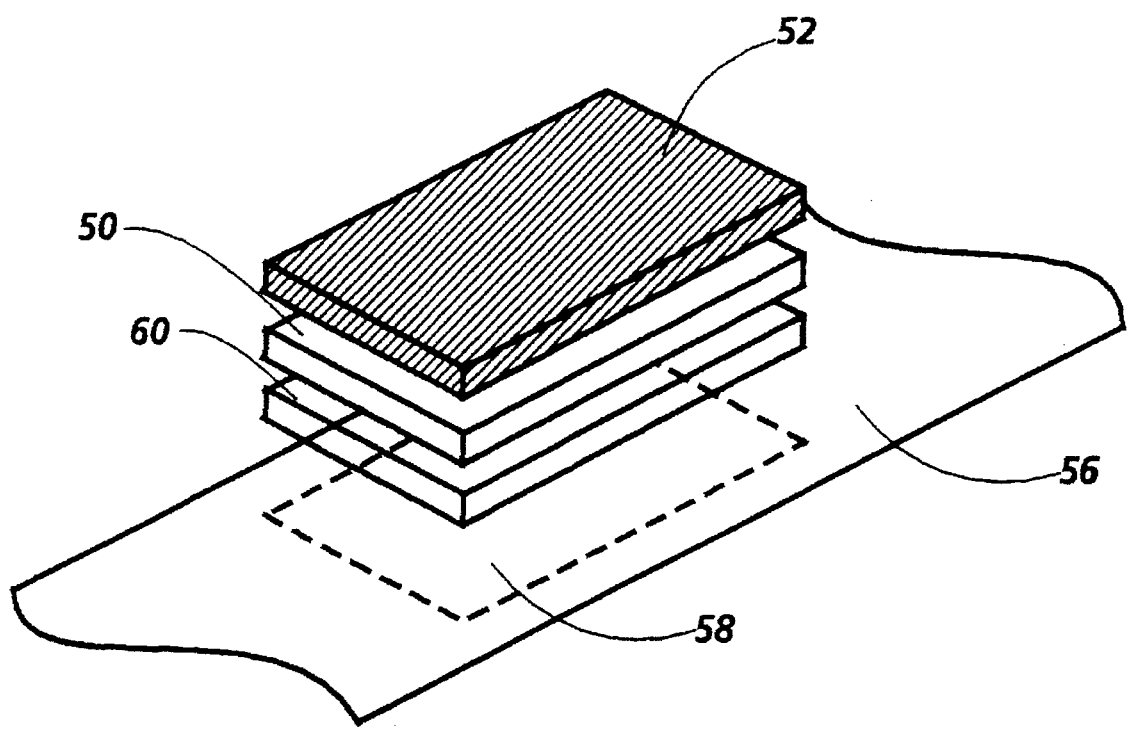
FIG. 3 is an alternative embodiment of the output light valve subsystem that employs a compact lenslet array in lieu the traditional lens-based optics.

FIG. 3 shows an alternative embodiment for the image exposure portion of the presently claimed imaging system. To achieve a more compact design of the exposure portion (i.e. light valve, backlight and optics), optics 54 may be replaced by a lenslet array 60, as depicted in FIG. 3. Lenslet array 60 are specialty, commercially available optics (from Corning under the trademark SMILE or from Nippon Sheet Glass under the trademark SELFOC) that allows for a closer spacing of output light valve 50 to the photoreceptor surface 56. While the optical path of traditional lens-based optics requires an optical path of up to three feet, the lenslet arrays may require only three inches—a significant reduction in design space requirements. The above-incorporated Printer application describes the application of lenslet arrays in greater detail.

Figure 4A:
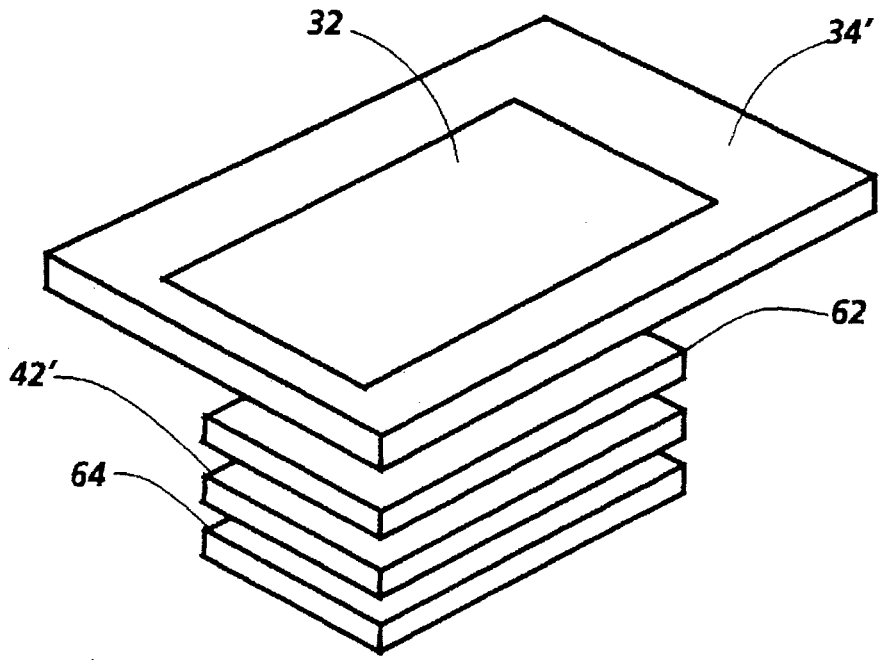
FIGS. 4A-4B are alternative embodiments of the image capture subsystem of the present invention.
Figure 4B:
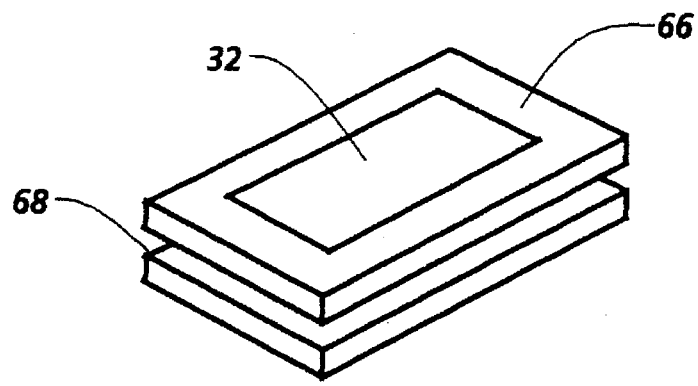

FIGS. 4A and 4B depict alternative embodiments for the image capture portion (i.e. input sensor array, backlight) of the presently claimed digital imaging system. FIG. 4A shows an embodiment where the traditional lens-based optics 40 of FIG. 2 is replaced with a lenslet array 62. When document page 32 is properly positioned atop platen 34, backlight 64 would flash expose (possibly in response to a signal from a driver) the page 34 through both the sensor array 42' and lenslet array 62 so that the image will be captured on the sensor array.

A second embodiment of the image capture portion of the present invention is shown in FIG. 4B. The platen has been replaced by a sensor array 66 which acts as a contact sensor with the document page 32 resting upon the surface of the array. Backlight 68 would flash expose the document page 32 through the surface of array 66. The operation of this embodiment is similar to the operation of the wedge shaped, contact scanner described in above-incorporated patent application by Turner. Both embodiments in FIGS. 4A and 4B serve to point out that the combination of a two-dimensional sensor array, coupled to a two-dimensional light valve, is a novel aspect of the presently claimed invention.

In summary, the present invention is a digital imaging system that combines a two-dimensional sensor array with a two-dimensional output light valve. The sensor array captures the image of an entire document page digitally by flash exposing the document page. Once captured, the digital data is read out of the sensor array and input to the output light valve. A pattern is set on the light valve according to the digital data. A backlight then flash exposes a photoreceptor with the image produced by the light transmitted through the light valve. A driver is provided to synchronize the actions of the backlights involved in exposing the document page and the photoreceptor, as well as the flow of digital data from the sensor array to the light valve.

What is claimed:

1. A digital imaging system comprising:

a document illumination source for simultaneously exposing an entire document page;

a two-dimensional sensor array for capturing an image of said document page when said document page is illuminated by said document illumination source and generating a full frame digital image representing the entire document page;

a two-dimensional output light valve array responsive to said full frame digital image and forming a pattern representing the entire document page;

a light valve illumination source for simultaneously illuminating said two-dimensional output light valve array; and a photoreceptor having a surface sensitive to light passing through said two-dimensional output light valve array.

2. The digital imaging system as recited in claim 1 further comprising a focusing system disposed between said two-dimensional output light valve and said image receptor surface.

3. The digital imaging system as recited in claim 1 further comprising a driver coupled to said document illumination source, said two-dimensional sensor array, said light valve illumination source and said two-dimensional output light valve, said driver synchronizing said document illumination source with said two-dimensional sensor array so that the document illumination source illuminates only when said two-dimensional sensor array is ready to capture the image, and said driver allowing said to flow to said two-dimensional output light valve only when said two-dimensional output light valve is ready to accept said full frame digital image, and said driver synchronizing said light valve illumination source with said two-dimensional output light valve so that said light valve illumination source illuminates only when said two-dimensional output light valve is set according to said full frame digital image.

4. The digital imaging system as recited in claim 3 wherein said driver further comprises an electronic subsystem, said electronic subsystem accepting said full frame digital image for further image processing.

5. The digital imaging system as recited in claim 4 wherein said electronic subsystem further comprises a storage unit, said storage unit storing and recalling said full frame digital image.

6. The digital imaging system as recited in claim 3 wherein said driver further comprises:

a document illumination source driver such that said document illumination source only illuminates in response to a signal from said document illumination source driver;

a light valve driver such that said is input to the two-dimensional output light valve in response to a signal from light valve driver;

a light valve illumination source driver such that said light valve illumination source flash exposes in response to a signal from said light valve illumination source driver.

7. The digital imaging system as recited in claim 2 wherein said focusing system comprises a lenslet array.

8. The digital imaging system as recited in claim 1 wherein said digital imaging system further comprises:

a platen on which said document is placed;

a lenslet array disposed between said two dimensional sensor array and said document illumination source; and wherein said document illumination source is a light valve illumination source that flash exposes said document through said sensor array and said lenslet array.

9. The digital imaging system as recited in claim 1 wherein:

said document illumination source is a backlight that flash exposes said document through said sensor array; and said two-dimensional sensor array is a contact array upon which said document is placed such that said two-dimensional array captures said document image when said document illumination source flash exposes said document.

* * * * *